United States Patent
Guarnizo (10) Patent No.: US 8,633,666 B2
(45) Date of Patent: Jan. 21, 2014

(54) METHOD AND DEVICE FOR ACTIVATING MONITORING BY A JAMMING PROTECTION FUNCTION IN AN ELECTRICAL CLOSING SYSTEM

(75) Inventor: Pablo Luis Guarnizo, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 13/127,792

(22) PCT Filed: Oct. 15, 2009

(86) PCT No.: PCT/EP2009/063494
§ 371 (c)(1),
(2), (4) Date: Jul. 22, 2011

(87) PCT Pub. No.: WO2010/052107
PCT Pub. Date: May 14, 2010

(65) Prior Publication Data
US 2011/0265381 A1 Nov. 3, 2011

(30) Foreign Application Priority Data
Nov. 5, 2008 (DE) .......................... 10 2008 043 483

(51) Int. Cl.
*H02P 3/02* (2006.01)
*H02K 23/66* (2006.01)

(52) U.S. Cl.
CPC ..................................... *H02K 23/66* (2013.01)
USPC ........... 318/446; 318/445; 318/447; 318/448; 318/449

(58) Field of Classification Search
CPC ..................................................... H02K 23/66
USPC ................................. 318/446, 445, 447–449
See application file for complete search history.

(56) References Cited

U.S. PATENT DOCUMENTS

| 4,686,598 | A | 8/1987 | Herr |
| 6,086,177 | A | 7/2000 | Driendl et al. |
| 6,298,295 | B1 | 10/2001 | Tyckowski |
| 6,823,132 | B2 * | 11/2004 | Saito et al. ..................... 388/806 |
| 7,095,200 | B2 | 8/2006 | Shinohara et al. |
| 7,496,442 | B2 * | 2/2009 | Guggolz et al. ................. 701/54 |
| 7,612,515 | B2 | 11/2009 | Oxle |

FOREIGN PATENT DOCUMENTS

| CN | 101046139 | 10/2007 |
| CN | 101148965 | 3/2008 |
| DE | 102006059446 A1 | 6/2008 |

* cited by examiner

*Primary Examiner* — Bentsu Ro
*Assistant Examiner* — David Luo
(74) *Attorney, Agent, or Firm* — Michael Best & Friedrich LLP (57) ABSTRACT

A method for activating a jamming protection function in an electrical closing system. The jamming protection function is designed to abort a movement of a closing part in a movement direction if it is detected that the movement of the closing part is obstructed by a jammed object by: —providing consecutively measured values of a motor variable of a motor that effect the movement of the closing part, wherein the motor variable gives an indication of a drive torque provided by the motor; —determining a gradient curve from the consecutively measured values of the motor variable, wherein the gradient curve is established using a derivative method that provides for a weighting of the individual consecutively measured values of the motor variable according to the measurement sequence thereof; —establishing a point in time for activating the jamming protection function according to the determined gradient curve.

10 Claims, 5 Drawing Sheets

METHOD AND DEVICE FOR ACTIVATING MONITORING BY A JAMMING PROTECTION FUNCTION IN AN ELECTRICAL CLOSING SYSTEM

BACKGROUND OF THE INVENTION

The invention relates to electrical closing systems and, in particular, to a trapping prevention function for electric window winders and vehicle roofs.

In electrical closing systems, for example electric window winders or roof systems in a motor vehicle, a closing part, for example a window pane or a moving vehicle roof, in vehicles can be electrically opened or closed, with an electric motor being used for moving the closing part. A closing process of the closing part is automatically monitored with the aid of a so-called trapping prevention function. In this case, trapping of an object between the moving closing part and stationary elements, for example a window frame, has to be identified before the trapping force exerted on the object by the electric motor via the window exceeds a determined value. The trapping prevention function is specified in the statutory regulations FWVSS 118 (S5) in the USA and 74/60/EEC (5.8.3) in the EU, with the maximum trapping force being defined as 100 N.

Electric window winders and roof systems are generally operated by an operator control element. An electric motor is driven by operation of the operator control element, with the window or the roof being opened or closed as a function of the direction of rotation of the electric motor. In order to implement the trapping prevention function, the current and/or the rotation speed of the DC motor are usually evaluated in a corresponding control unit, this allowing cost-effective implementation of said function.

EP 0 865 137 A1 discloses a method for controlling the closing process of closing devices in the case of at least one part which is moved by electric motor, with a trapping prevention function being activated in the start-up phase as a function of the profile, which is dependent on the closing travel, of at least one characteristic motor variable when a closing travel-dependent activation value is reached.

EP 1 168 559 A1 discloses that, in the case of an automatic window winder, identifying an object which forms an obstruction using a profile of a rotation speed and accordingly triggering a trapping prevention function so that the force on the object is limited.

It is difficult to comply with the statutory requirements during start-up of a motor since the characteristic motor variables, for example the motor rotation speed and the motor current, can vary considerably as a function of the degree of drive play, the change in friction over the service life of the closing system and the position of the closing part. However, the reaction rate during start-up of a motor plays a crucial role. Furthermore, the drive play must not have any effect on the time for activating the trapping prevention function during start-up of the electric motor which drives the closing mechanism.

Basically, it is necessary, in the case of an electric window winder, to activate the trapping prevention function as quickly as possible after operation of the operator control element, so that trapping can be identified as far as possible without a dangerous delay. On account of the considerable variation in the characteristic motor variables which occurs particularly during start-up of the motor, it is not possible to activate the trapping prevention function at the same time as the operator control element is operated in order to activate the window winder since instances of incorrect identification cannot be precluded.

SUMMARY OF THE INVENTION

The object of the present invention is therefore to provide a method and a device for activating monitoring by a trapping prevention function during start-up of an electric motor which drives a closing system, in which method the trapping prevention function is activated as quickly as possible after the closing system is started, and in which method instances of incorrect identification of a trapping event can be avoided as far as possible.

This object is achieved by the method for activating monitoring of a trapping prevention.

A first aspect provides a method for activating a trapping prevention function in an electrical closing system, with the trapping prevention function being designed to interrupt a movement of a closing part in a movement direction when it is identified that the movement of the closing part is impeded by a trapped object. The method comprises the following steps:

supplying successively detected values of a motor variable of a motor which causes the movement of the closing part, with the motor variable providing information about a drive torque which is supplied by the motor;

determining a gradient profile from the successively detected values of the motor variable, with the gradient profile being ascertained with the aid of a derivation method which weights the individual successively detected values of the motor variable as a function of the order in which they were detected;

ascertaining a time for activating the trapping prevention function as a function of the determined gradient profile.

One idea of the above method is that of observing a motor variable, for example the motor current or the motor rotation speed, and ascertaining a gradient profile in accordance with a derivation method. The trapping prevention function is activated as a function of the gradient profile after the closing system is started. The derivation method weights the profile of the gradient so that the gradient values of the motor current which are further back, that is to say the older gradient values of the motor current, are given a lower weighting than the more recent gradient values of the motor current. Since activation of the trapping prevention function is dependent on the gradient profile of the motor variable, it is possible, on account of tolerances, disturbances or other influences, or on account of the drive play, for fluctuations, which are similar to noise, in the gradient for determining the local maximum to be filtered such that a delay when evaluating the gradient profile is reduced, as would be the case, for example, with simple low-pass filtering.

Furthermore, the time for activating the trapping prevention function can be determined as a function of the detection of a local maximum of the determined gradient profile.

The time for activating the trapping prevention function can be determined after a gradient value of the gradient profile has assumed a negative value and there is a zero crossing of the gradient profile in the positive direction.

According to one embodiment, the time for activating the trapping prevention function can be carried out as a function of a ratio between the mechanical power and the electrical power of the motor. As a result, the total power balance, mechanical and electrical, is observed and evaluated for identifying the drive play during start-up of a motor, without taking into consideration the last directional movement.

Furthermore, the derivation method for determining the gradient profile can be carried out according to a transfer function $H(z)=K \times [z-1/z-\lambda]$.

A further aspect provides a device for activating a trapping prevention function in an electrical closing system. The trapping prevention function is designed to interrupt a movement of a closing part in a movement direction when it is identified that the movement of the closing part is impeded by a trapped object. The device comprises:

a detection unit for supplying successively detected values of a motor variable of a motor which causes the movement of the closing part, with the motor variable providing information about a drive torque which is supplied by the motor;

a control unit for determining a gradient profile from the successively detected values of the motor variable, with the gradient profile being ascertained with the aid of a derivation method which weights the individual successively detected values of the motor variable as a function of the order in which they were detected, and for ascertaining a time for activating the trapping prevention function as a function of the determined gradient profile.

A further aspect provides a motor system having the above device and an electric motor.

A further aspect provides a closing system, in particular a window winder system, having the above motor system and a closing mechanism by means of which a closing part can be moved.

A further aspect provides a computer program which, when it is run on a data processing unit, executes the above method.

BRIEF DESCRIPTION OF THE DRAWINGS

Preferred embodiments of the invention are explained in greater detail below with reference to the appended drawings, in which.

DETAILED DESCRIPTION

Figure 1:
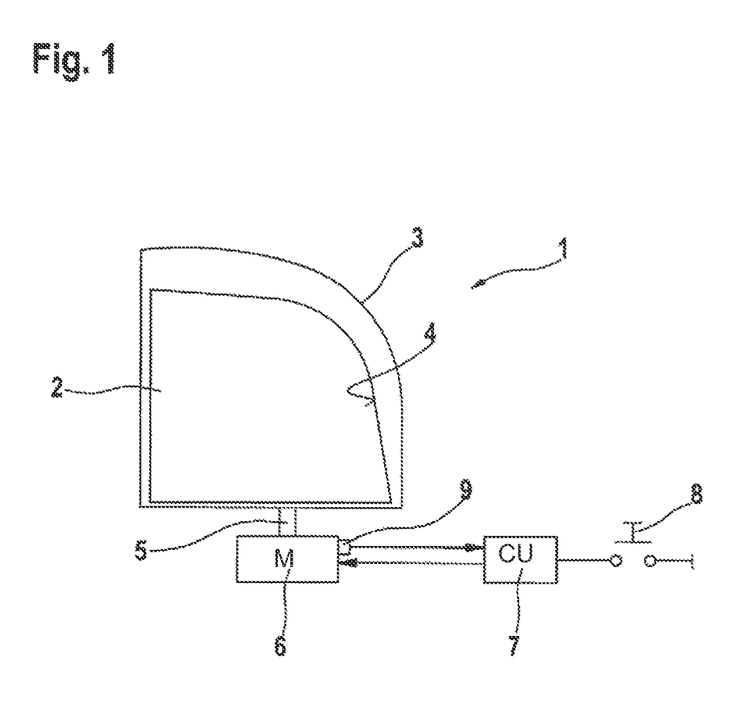
FIG. 1 shows a schematic illustration of an automatic window winder system, for example for a motor vehicle.

FIG. 1 schematically shows, by way of example, a window winder system 1 in which a window pane 2 is provided as the closing part and can be moved relative to a window frame 3, and the window can be opened and closed in this way. To this end, the window pane 2 can be moved with the aid of a closing mechanism 5, so that an edge 4 of the window pane 2 moves toward the window frame 3 or moves away from said window frame in order to close or open the window.

The closing mechanism 5 is driven by an electric motor 6, a supply voltage being directly supplied to said electric motor or being supplied by a control unit 7 when a corresponding operator control device 8, for example a switch, such as a push switch, is operated by a user, in order to operate the window winder. The control unit 7 implements all the necessary functions for actuating the electric motor 6 in a specific direction of rotation, so that the window pane 2 can be moved in the direction of the window frame 3 for the purpose of closing the window.

A current sensor 9 is provided as a detection unit for the purpose of detecting the state of the electric motor, said current sensor transmitting information about a current flow through the electric motor to the control unit 7.

Any other closing system in which a moving closing part can be moved such that an object can become trapped can be considered instead of the window winder system 1.

Figure 2:
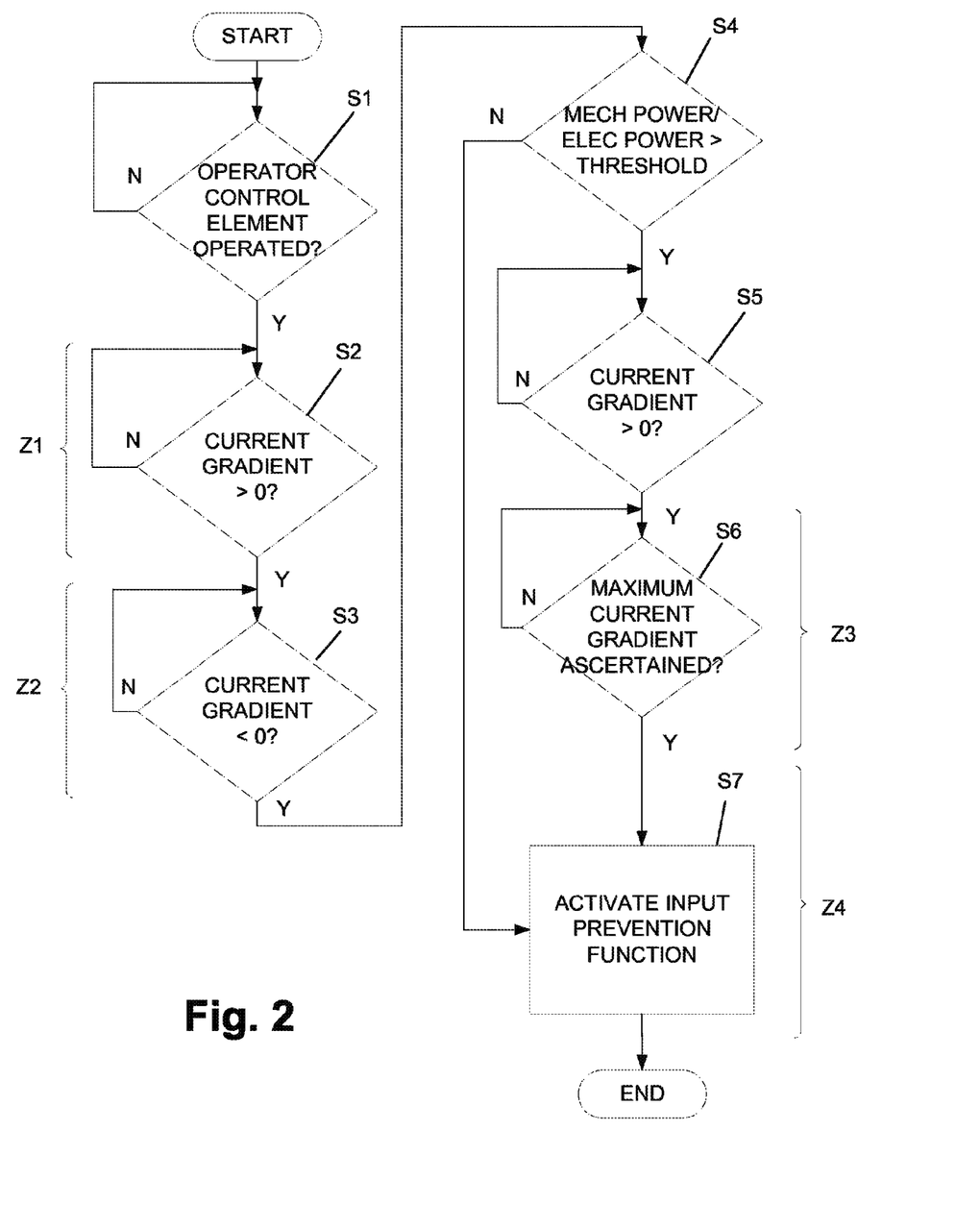
FIG. 2 shows a flowchart for illustrating the method, which is implemented in the control unit, for activating the trapping prevention function.

FIG. 2 shows a flowchart for implementing the function of the window winder system 1. Said figure shows, in particular, that the start-up of the electric motor 6 after operation of the operator control element 8 and the activation of the trapping prevention function after the risk of inadvertent triggering of the trapping prevention function during a start-up phase is reduced.

Figure 3:
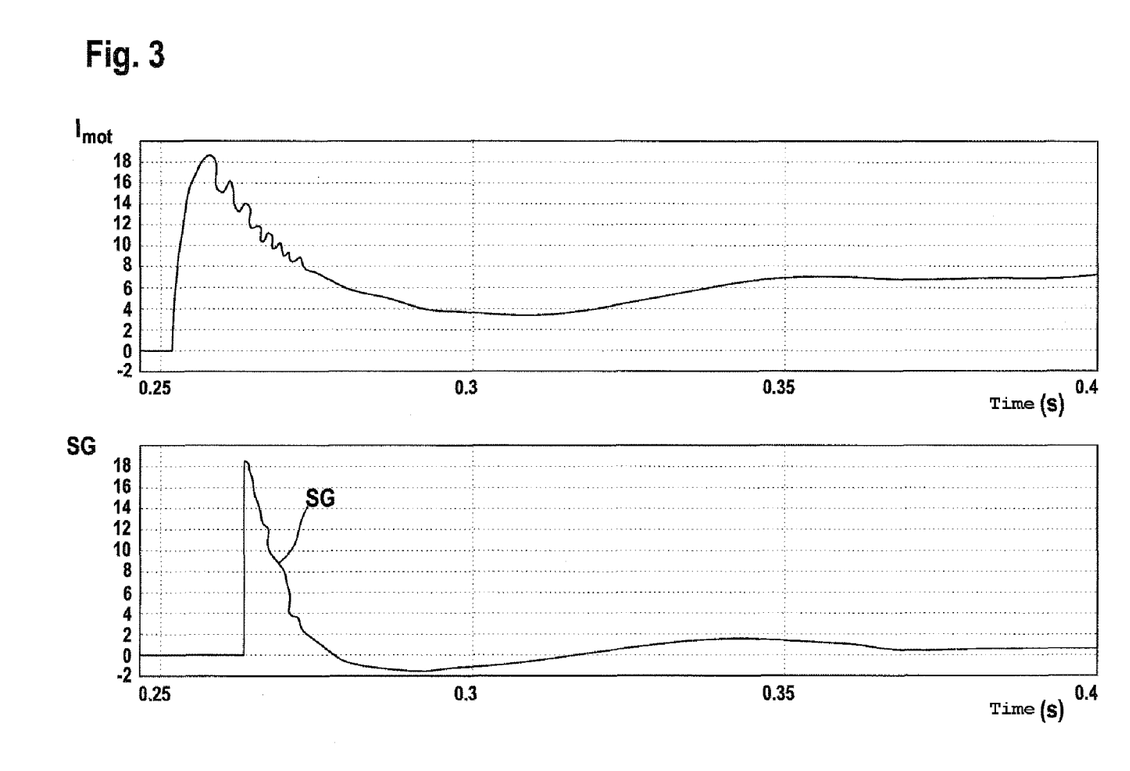
FIG. 3 shows a profile of a motor current and the gradient of said profile, which is ascertained with the parameter λ, during start-up of the electric motor with drive play.

In step S1, a check is made as to whether the operator control element 8 has been operated. If the operator control element 8 has not been operated, no further function takes place in the controller 7 (alternative: no). If the operator control element 8 is operated (alternative: yes), the motor current $I_{mot}$, which is measured by the current sensor 9 on the electric motor 6, rises sharply, as shown in FIG. 3 (upper characteristic curve), since a high torque is required to overcome the static friction and to supply the start-up torque. The motor current $I_{mot}$ then falls, specifically by an amount which depends on whether the coupling between the electric motor 6 with the closing mechanism 3 exhibits play or not. If the window pane 2 and the electric motor 6 are coupled, the window pane is moved, this being manifested by an increasing motor current $I_{mot}$ which settles at a specific value when the window pane 2 moves at a constant winding speed.

As the motor variable, the motor current $I_{mot}$ is detected with the aid of the current sensor 9. The current sensor 9 can have, for example, a shunt. The voltage which is dropped across the shunt is proportional to the flowing motor current $I_{mot}$ and can be converted into a digital signal with the aid of a microcontroller, which can be provided in the control unit 7, so that the motor current $I_{mot}$, as the motor variable, is provided in the form of a digital signal from the control unit 7. The digitized motor current $I_{mot}$ can be evaluated and a motor rotation speed, for example, can be derived from the current value profile.

The control unit 7 implements a trapping prevention function which, when it is activated, monitors motor parameters, such as motor current $I_{mot}$, motor current gradient SG and the like, and triggers the electric motor 6 to switch off or reverse when it is identified that an article or a body part is trapped by checking the supplied motor variable. Triggering of the trapping prevention function will not be discussed any further in the text which follows.

The present method relates mainly to the case of activation of the trapping prevention function during start-up of the electric motor 6 since considerable fluctuations in the motor start-up torque to be applied can be expected there on account of drive play, changes in friction and the like. Reliable identification of trapping by the trapping prevention function by observing the motor current $I_{mot}$, which depends directly on the drive torque to be applied, is not ensured during this phase. Nevertheless, the trapping prevention function should be activated as quickly as possible after the variable start-up phase is overcome, so that an object or body part which is located between the window pane 2 and the window frame cannot be impermissibly put at risk.

The time for activating the trapping prevention function is identified using a gradient profile, with the change in the motor current gradient SG being observed. In this case, a decision is made about the activation of the trapping prevention function as a function of the local maxima and minima of the current gradient profile SG which are achieved. Instead of conventional derivation of the motor current profile for determining the motor current gradient SG, the motor current gradient SG is formed with the aid of the following transfer function:

$$H(z)=K\times[z-1/z-\lambda].$$

The transfer function corresponds to a Z transformation of the discrete motor current values. The reaction rate of the derivative with respect to time of the motor current $I_{mot}$ is determined by the parameter $\lambda$. The value H(z) which is transformed back into the time plane then corresponds to SG.

FIG. 3 (lower characteristic curve) shows the motor current gradient profile SG, which is modeled with the transfer function, with a $\lambda$ value of 0.9 during start-up of the motor. The parameter $\lambda$ acts as a weighting factor with which the gradient values SG for the motor current gradient profile which are further back, that is to say the older gradient values, are given a lower weighting than the more recent gradient values. $\lambda$ therefore determines the reaction rate of the derivative with respect to time.

FIG. 3 shows that, in the case of the profile of the motor current gradient SG, the changes in motor current $I_{mot}$ can be seen more quickly in the motor current gradient profile SG than in the profile of the motor current $I_{mot}$.

An infinite state machine is implemented in the control unit 7, said infinite state machine checking a plurality of motor states Z after operation of the operator control element 8 in step S1, before the trapping prevention function is activated.

In step S2, a check is made as to whether the actual current gradient which is ascertained with the above transfer function given a specific first gradient parameter $\lambda_1$ is greater than 0, in order to thus identify start-up of the electric motor 6. As long as the current gradient is greater than 0, a first state Z1 is present. If the motor current gradient is greater than 0 (alternative: yes), the process waits, in step S3, until the motor current gradient profile exhibits a zero crossing and therefore becomes negative. If this is not the case (alternative: no), the first motor state Z1 is maintained until the motor current gradient becomes negative (alternative: yes).

After the transition in state to the motor state Z2, which is triggered by the zero crossing, a new parameter $\lambda_2$ is used. If the actual current gradient which is ascertained with the specific second gradient parameter $\lambda_2$ is negative, this corresponding to a second motor state Z2, a check is made in a next step S4 as to what the ratio of the mechanical motor power to the electrical power is and the method jumps to step S5 or to step S7, which corresponds to a fourth motor state Z4, as a function of the resulting value.

The power balance of the electric motor is as follows:

$$U\cdot I=I^2\cdot R+K\cdot I\cdot\Omega,$$

where U corresponds to the supply voltage, I corresponds to the current consumption by the electric motor 6, R corresponds to the non-reactive resistance of the armature winding, K corresponds to the motor constant and $\Omega$ corresponds to the motor rotation speed. The product $U\cdot I$ corresponds to the total power drawn which can be calculated by corresponding measurements in the control unit 7 (not shown). The product $I^2\cdot R$ describes the electrical power loss of the armature winding which is manifested in the production of heat by the electric motor 6. The product $K\cdot I\cdot\Omega$ is the mechanical power which is made up of the mechanical power loss, for example friction, air resistance and the like, and the useful mechanical power which can be drawn.

The check in step S4 ascertains whether the ratio of mechanical power $P_{mech}$ to electrical power $P_{el}$, specifically $K\cdot I\cdot\Omega/I^2\cdot R$, is greater than a specific threshold value or not. Possible threshold values can be between 2 and 4, preferably between 2.5 and 3.5, in particular 3.

If the ratio is lower than a specific threshold value (alternative: no), there is no drive play and the fourth motor state Z4 is assumed and the method jumps to step S7. If the ratio is greater than a specific threshold value (alternative: yes), drive play has been identified and the method jumps to step S5. In step S5, a check is made as to whether there is a further zero crossing in the positive direction. If a further zero crossing is detected, the method moves to the third motor state Z3. In the third motor state Z3, the motor current gradient is calculated with a third gradient parameter $\lambda_3$. As a result, a maximum of the motor current gradient is ascertained with the aid of the third gradient parameter $\lambda_3$ (step S7) and, as soon as the maximum of the motor current gradient has been ascertained (alternative: yes), the method moves to the fourth motor state Z4 and jumps to step S7 by the trapping prevention function being activated.

The gradient parameters $\lambda_1$, $\lambda_2$ and $\lambda_3$ can be different and can be ascertained empirically as a function of the window winder system 1. The parameters of $\lambda$ are preferably between 0.9 and 1, preferably between 0.95 and 0.96.

Figure 4:
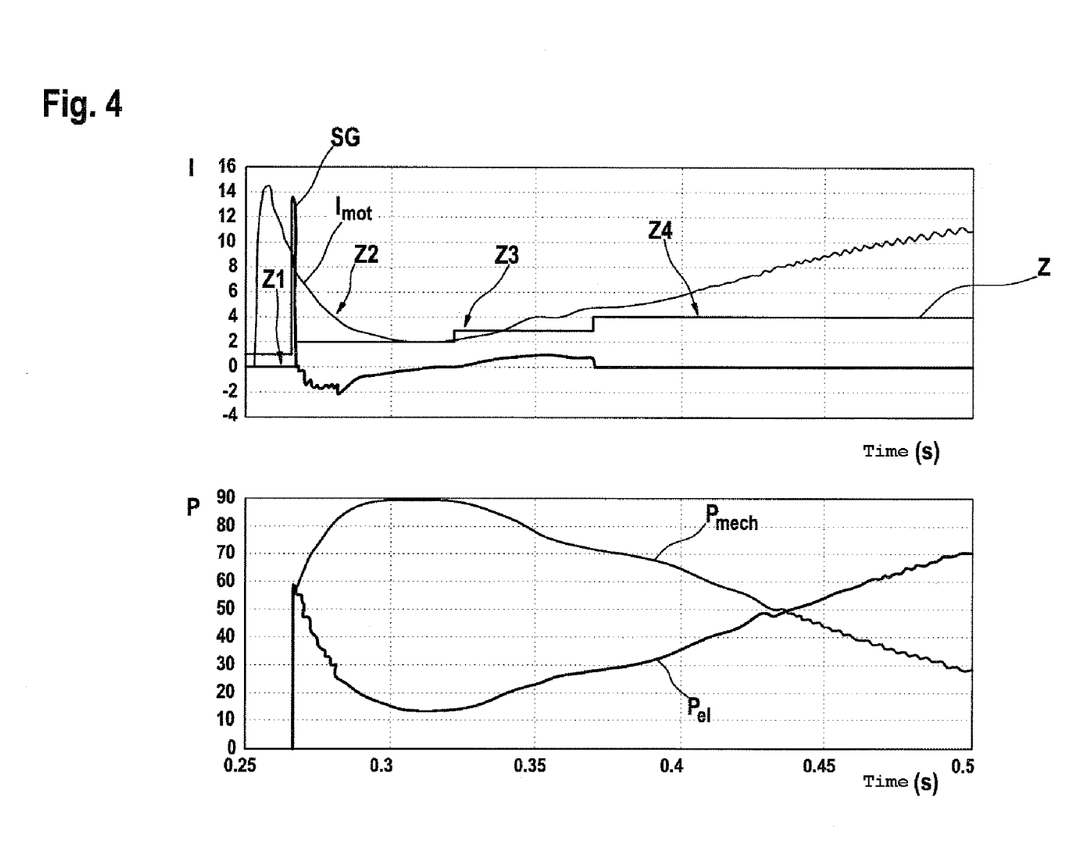
FIG. 4 shows timing diagrams for illustrating the profiles of the motor current, the control state, the motor current gradient, the electrical power and the mechanical power during start-up of a motor with drive play.
Figure 5:
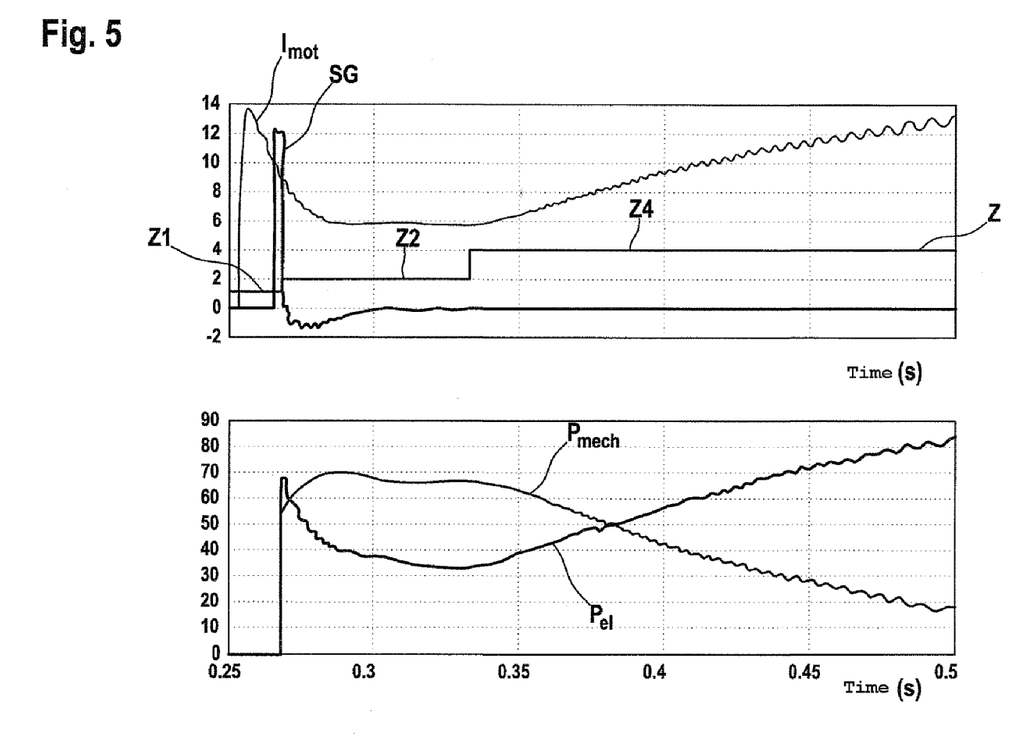
FIG. 5 shows timing diagrams for illustrating the profiles of the motor current, the control state, the motor current gradient, the electrical power and the mechanical power during start-up of a motor without drive play.

FIGS. 4 and 5 show the time profiles of the motor current gradient taking into account the above-mentioned transfer function where $\lambda=0.9$, the motor states as a level of a signal Z, the electrical power and the mechanical power during start-up of the motor with drive play and, respectively, during start-up of the motor without drive play. Start-up of the motor exhibits drive play, for example, when the last direction of movement of the window pane 2 was directed downward, and the window pane 2 is now intended to be moved upward again in order to close the window.

Start-up of the motor without drive play can be, for example, start-up of the motor of which the last direction of movement was directed upward and of which the actuated direction of movement is likewise upward. The stepped signal indicates the motor states. As soon as a positive current gradient is identified with the aid of the current gradient, the state signal z changes over to a state 1. As soon as the current gradient assumes negative values, the state signal of the motor state changes over to the motor state Z2. The third motor state Z3 is assumed at a next zero crossing of the actual current gradient, which is ascertained with the third gradient parameter $\lambda_3$, in the positive direction since, after the zero crossing of the motor current gradient from negative values to positive values, the ratio of the mechanical power to the electrical power was greater than a predefined threshold value, for example was greater than 3 in the present case. The motor current gradient profile is now examined for the next local maximum, with the fourth motor state Z4, in which the trapping prevention function is activated, being assumed after the local maximum is clearly identified.

FIG. 5 shows that the motor current gradient slowly approaches the value zero in the motor state Z2 in the case of negative values on account of the lack of drive play, and, when the value zero is reached, a check is made in the second motor state Z2 as to whether the ratio of the mechanical power to the electrical power exceeds a threshold value. If this threshold value is not exceeded, as is the case when there is no drive play, the infinite state machine, which is implemented in the control unit 7, moves directly from the second motor state Z2 to the fourth motor state Z4 in which the input prevention function is activated.

The invention claimed is:

1. A method for activating a trapping prevention function in an electrical closing system, with the trapping prevention function being designed to interrupt a movement of a closing part in a movement direction when it is identified that the movement of the closing part (2) is impeded by a trapped object, the method comprising:
supplying successively detected values of a motor variable ($I_{mot}$) of a motor (6) which causes the movement of the closing part, with the motor variable ($I_{mot}$) providing information about a drive torque which is supplied by the motor (6);
determining a gradient profile from the successively detected values of the motor variable ($I_{mot}$), with the gradient profile being ascertained with the aid of a derivation method which weights the individual successively detected values of the motor variable ($I_{mot}$) as a function of the order in which they were detected; and
ascertaining a time for activating the trapping prevention function as a function of the determined gradient profile.

2. The method as claimed in claim 1, wherein the time for activating the trapping prevention function is determined as a function of the detection of a local maximum of the determined gradient profile.

3. The method as claimed in claim 2, wherein the time for activating the trapping prevention function is determined after a gradient value (SG) of the gradient profile (SG) has assumed a negative value and there is a zero crossing of the gradient profile (SG) in the positive direction.

4. The method as claimed in claim 1, wherein the time for activating the trapping prevention function is carried out as a function of a ratio between the mechanical power ($P_{mech}$) and the electrical power ($P_{el}$) of the motor (6).

5. The method as claimed in claim 1, wherein the derivation method for determining the gradient profile is carried out according to a transfer function $H(z)=K\times[z-1/z-\lambda]$.

6. A device for activating a trapping prevention function in an electrical closing system, with the trapping prevention function being designed to interrupt a movement of a closing part (2) in a movement direction when it is identified that the movement of the closing part (2) is impeded by a trapped object; comprising:
a detection unit (9) for supplying successively detected values of a motor variable ($I_{mot}$) of a motor (6) which causes the movement of the closing part (2), with the motor variable ($I_{mot}$) providing information about a drive torque which is supplied by the motor (6);
a control unit (7) for determining a gradient profile from the successively detected values of the motor variable ($I_{mot}$), with the gradient profile being ascertained with the aid of a derivation method which weights the individual successively detected values of the motor variable ($I_{mot}$) as a function of the order in which they were detected, and for ascertaining a time for activating the trapping prevention function as a function of the determined gradient profile.

7. A motor system having a device as claimed in claim 6 and an electric motor (6).

8. A closing system having a motor system as claimed in claim 7 and having a closing mechanism (5) by means of which a closing part can be moved.

9. The closing system as claimed in claim 8, wherein the closing system is a window closing system.

10. A non-transitory computer readable medium including a computer program executed by a controller for performing a method for activating a trapping prevention function in an electrical closing system, with the trapping prevention function being designed to interrupt a movement of a closing part in a movement direction when it is identified that the movement of the closing part (2) is impeded by a trapped object, the method comprising:
supplying successively detected values of a motor variable ($I_{mot}$) of a motor (6) which causes the movement of the closing part, with the motor variable ($I_{mot}$) providing information about a drive torque which is supplied by the motor (6);
determining a gradient profile from the successively detected values of the motor variable ($I_{mot}$), with the gradient profile being ascertained with the aid of a derivation method which weights the individual successively detected values of the motor variable ($I_{mot}$) as a function of the order in which they were detected; and
ascertaining a time for activating the trapping prevention function as a function of the determined gradient profile.

* * * * *

UNITED STATES PATENT AND TRADEMARK OFFICE
CERTIFICATE OF CORRECTION

PATENT NO. : 8,633,666 B2  Page 1 of 1
APPLICATION NO. : 13/127792
DATED : January 21, 2014
INVENTOR(S) : Pablo Luis Guarnizo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 348 days.

Signed and Sealed this
Twenty-second Day of September, 2015

Michelle K. Lee
*Director of the United States Patent and Trademark Office*